(12) United States Patent
Strashny

(10) Patent No.: US 11,688,973 B2
(45) Date of Patent: Jun. 27, 2023

(54) CONNECTOR ASSEMBLY FOR CONDUCTOR ROD HAVING MULTIPLE DEGREES OF FREEDOM

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/535,301

(22) Filed: Nov. 24, 2021

(65) Prior Publication Data

US 2023/0163521 A1 May 25, 2023

(51) Int. Cl.
*H01R 13/627* (2006.01)
*H01R 13/631* (2006.01)

(52) U.S. Cl.
CPC ..... *H01R 13/6273* (2013.01); *H01R 13/6315* (2013.01); *H01R 2201/26* (2013.01)

(58) Field of Classification Search
CPC ............ H01R 13/6273; H01R 13/6315; H01R 2201/26
See application file for complete search history.

(56) References Cited

U.S. PATENT DOCUMENTS

| | | | |
|---|---|---|---|
| 6,126,293 A * | 10/2000 | Wu | F21V 33/0004 135/910 |
| 6,750,399 B1 | 6/2004 | Daumling | |
| 8,872,026 B2 | 10/2014 | Guyader et al. | |
| 8,925,405 B2 | 1/2015 | Kawabuchi et al. | |
| 8,978,852 B2 | 3/2015 | Andre et al. | |
| 9,870,845 B2 | 1/2018 | Nagahashi | |
| 10,053,096 B2 | 8/2018 | Schunk et al. | |
| 10,137,785 B2 | 11/2018 | Vahle et al. | |
| 10,232,719 B2 | 3/2019 | Tajima | |
| 2010/0326942 A1 | 12/2010 | Dahlstrom et al. | |
| 2012/0012406 A1 | 1/2012 | Stoicoviciu | |
| 2013/0342085 A1 | 12/2013 | Tsui | |
| 2014/0209345 A1 * | 7/2014 | Minadeo | H01R 4/72 174/84 R |

(Continued)

FOREIGN PATENT DOCUMENTS

| | | |
|---|---|---|
| CN | 201516809 U | 6/2010 |
| CN | 101947920 A | 1/2011 |

(Continued)

OTHER PUBLICATIONS

Written Opinion and International Search Report for Int'l. Patent Appln. No PCT/US2022/080293, dated Apr. 3, 2023 (8 pgs).

(Continued)

*Primary Examiner* — Gary F Paumen

(57) ABSTRACT

A work machine, such as a hauler at a mining site, includes a conductor rod housing concentric metal tubes for receiving electrical power from a contactor sliding on a power rail. A connection assembly includes lugs branching orthogonally from respective ones of the concentric metal tubes to an exterior of the conductor rod. The lugs include ball-and-socket joints configured to enable semi-spherical movement of the lugs at the exterior with respect to the joints. When attached to the contactor via conductive arms, the connection assembly provides multiple degrees of freedom for the conductor rod relative to the contactor and avoids detachment of the contactor from the power rail.

20 Claims, 9 Drawing Sheets

(56) References Cited

U.S. PATENT DOCUMENTS

| | | |
|---|---|---|
| 2014/0345904 A1 | 11/2014 | Nagahashi |
| 2014/0370741 A1* | 12/2014 | Bolcato ................ G01R 15/16 439/471 |
| 2015/0321563 A1 | 11/2015 | Buehs et al. |
| 2016/0264000 A1 | 9/2016 | Zimmerman et al. |
| 2017/0106767 A1 | 4/2017 | Tajima et al. |
| 2017/0166084 A1 | 6/2017 | Tajima |
| 2017/0210238 A1 | 7/2017 | Buehs et al. |

FOREIGN PATENT DOCUMENTS

| | | |
|---|---|---|
| CN | 102785592 | 11/2012 |
| CN | 204452108 U | 7/2015 |
| CN | 107215238 A | 9/2017 |
| CN | 108340809 A | 7/2018 |
| CN | 211543283 U | 9/2020 |
| EP | 1389818 A1 | 2/2004 |
| EP | 2284635 A | 2/2011 |
| EP | 3812195 A1 | 4/2021 |
| JP | 6691672 B2 | 5/2020 |
| KR | 20110004402 A | 1/2011 |
| KR | 101759368 B1 | 7/2017 |
| KR | 20210027465 A | 3/2021 |
| WO | 2009003765 A1 | 1/2009 |
| WO | WO2009007879 A2 | 1/2009 |
| WO | 2015115474 A1 | 8/2015 |
| WO | WO2020186296 A1 | 9/2020 |

OTHER PUBLICATIONS

Written Opinion and International Search Report for Int'l. Patent Appln. No PCT/US2022/049878, dated Apr. 3, 2023 (9 pgs).

Written Opinion and International Search Report for Int'l. Patent Appln. No PCT/US2022/049877, dated Apr. 7, 2023 (9 pgs).

Written Opinion and International Search Report for Int'l. Patent Appln. No PCT/US2022/080288, dated Apr. 10, 2023 (9 pgs).

\* cited by examiner

# US 11,688,973 B2

CONNECTOR ASSEMBLY FOR CONDUCTOR ROD HAVING MULTIPLE DEGREES OF FREEDOM

TECHNICAL FIELD

The present disclosure relates to a conductive rod and connector for conveying electrical power to a moving vehicle. More specifically, the present disclosure relates to a conductive rod with a connector assembly having multiple degrees of freedom, and to an electrically powered work machine coupled to a roadside power source via the conductive rod and connector assembly.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

Electrical power has been used to supplement these diesel engines while the work machines move. In some environments, the electrical power is delivered from wires over the haul route to a pantograph on the work machine as the machine travels the haul route, as in a cable car. But overhead wires cannot reliably provide sufficient electrical energy to power a heavy work machine during long movements. Nor can the overhead delivery provide enough current to charge backup batteries for an electric machine at the same time. As a result, electrical power through overhead wires typically supplements, rather than replaces, diesel engines in heavy work machines.

In other environments, on the other hand, a power rail based on the ground may provide electrical power to heavy work machines. Maintaining an electrical connection with a power rail while a heavy work machine moves can be challenging, however. In locations such as a mining site, the haul route may be uneven, hilly, and pocked. These variations may lead to irregular movements by the machine or unexpected changes in position by the power rail, causing the machine to disconnect from the rail. Steering deviations for the heavy work machine could also disrupt the connection of the machine with the power rail, detracting from the value of rail-based delivery of electrical power.

One approach for providing electrical power to a work machine while traveling on a roadway is described in International Patent App. Pub. No. WO 2020/186296A1 ("the '296 application"). The '296 application describes an electrical delivery system at a mine site where two or more conductors extend along a roadside, a contact assembly maintains electrical connection with the roadside conductors, and an electric current collector carries electrical power from the contacts to a moving vehicle. The electric current collector includes an arm that is retractable to the vehicle and includes one or more rigid mechanical linkages. The linkages, however, are in the form of single-arm or double-arm pantographs that purportedly allow for lateral pivoting movement while maintaining a parallel connection between the vehicle and the contact assembly. The '296 application does not contemplate more diverse movements that may arise between a vehicle and roadside conductors. As a result, the system of the '296 application is not desirable for heavy work machines operating in environments in which the relative positions of the vehicle and the roadside conductors may change in multiple dimensions.

Examples of the present disclosure are directed to overcoming deficiencies of such systems.

SUMMARY

In an aspect of the present disclosure, an apparatus for conducting electrical energy includes a rigid tubular shell having a first end and a second end and a longitudinal center defining an axis between the first end and the second end. The apparatus has a first metal tube that extends along the axis, a second metal tube disposed concentrically around and apart from the first metal tube; and a terminal at the second end. The terminal includes a first metal lug electrically coupled to the first metal tube and extending orthogonally from the axis and exterior to the sheath, and a second metal lug electrically coupled to the second metal tube and extending orthogonally from the axis and exterior to the sheath.

In another aspect of the present disclosure, a conductor assembly includes a first metal tube extending along a longitudinal axis and a second metal tube arranged concentrically around and apart from the first metal tube. A first metal lug is electrically coupled to the first metal tube and extends orthogonally from the longitudinal axis, while a second metal lug is electrically coupled to the second metal tube and extends orthogonally from the longitudinal axis. At least one of the first metal lug and the second metal lug comprises a pivot joint.

In yet another aspect of the present disclosure, a work machine includes an electric engine, traction devices configured to cause movement of the work machine when powered by the electric engine, and a conductor rod configured to convey electrical energy to the work machine during the movement of the work machine. The conductor rod includes a first tubular conductor and a second tubular conductor that extend concentrically around a longitudinal axis and are separated, at least in part, by air. A first lug and a second lug are disposed at an exterior of the conductor rod and branch orthogonally from the first tubular conductor and the second tubular conductor, respectively, to the exterior. The first lug and the second lug include pivot joints adjacent the exterior, where the pivot joints are configured to enable the first lug and the second lug to move around a hemispherical space with respect to the pivot joints.

DETAILED DESCRIPTION

Figure 1:
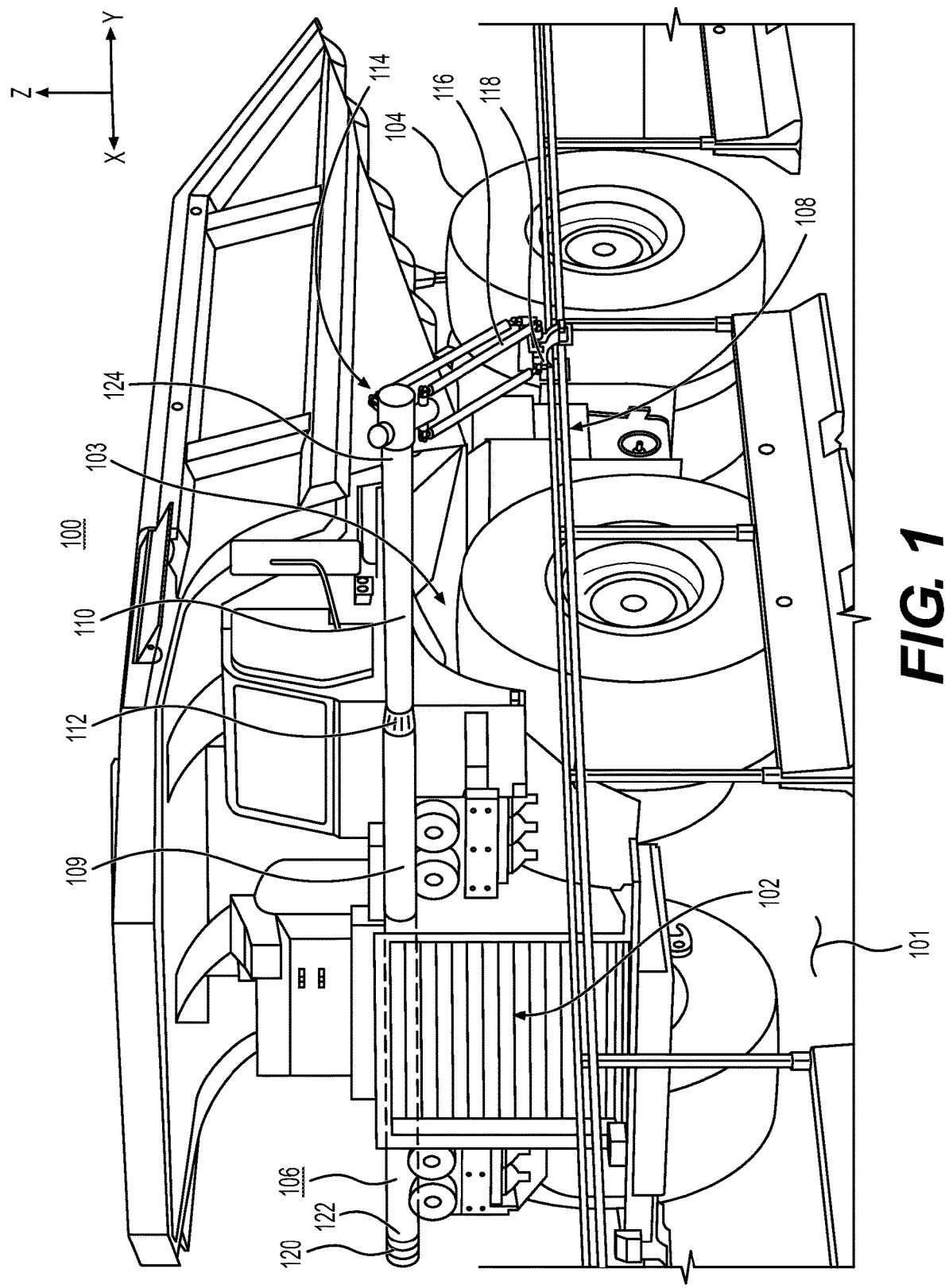
FIG. 1 is an isometric view of an electrically powered work machine coupled to a roadside power source via a conductive rod, connector, and trailing arms in accordance with an example of the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. Exemplary work machine 100 travels along a defined path or roadway, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along roads to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. Exemplary work machine 100 travels along a defined path or roadway, also termed haul route 101, typically from a source to a destination within a worksite. In one implementation as illustrated, work machine 100 is a hauling machine that carries a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While illustrated as a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any movable machine associated with various industrial applications including, but not limited to, mining, agriculture, forestry, construction, and other industrial applications.

Referring to FIG. 1, and relevant to the present disclosure, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. A primary example of mechanical energy provided by electric engine 102 is propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, work machine 100 further includes a conductor rod 106 configured to receive electrical power from a power rail 108. In some examples, power rail 108 includes one or more beams of metal arranged substantially parallel to and a distance above the ground. Support mechanisms hold power rail 108 in place along a distance at the side of a haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 (along the Y axis) as work machine 100 travels in the direction of the X axis, power rail 108 may be installed to the right of work machine 100 (along the −Y axis) or in other locations suitable to the particular implementation. In many examples, such as within a mining site, power rail 108 will not be configured continuously at a fixed distance along a side of haul route 101 and at a fixed height above the ground due, at least in part, to the variation of the terrain. Therefore, it is expected that the vertical, horizontal, and angular positions of the surface of power rail 108 in the XYZ planes will vary along haul route 101.

Power rail 108 provides a source of electrical power for work machine 100 as either AC or DC voltage. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides a reference voltage of 0 volts, with the two powered conductors providing +1500 VDC and −1500 VDC. These values are exemplary, and other physical and electrical configurations for power rail 108 are available and within the knowledge of those of ordinary skill in the art.

Conductor rod 106 enables electrical connection between work machine 100 and power rail 108, including during movement of work machine 100 along haul route 101. In the example shown in FIG. 1, conductor rod 106 is an elongated arm resembling a rigid pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a proximal end near a right side of work machine 100 and a distal end at a left side of work machine 100. Conductor rod 106 may be attached to any convenient location within work machine 100, such as to frame 103, in a manner to enable conductor rod 106 to reach and couple to power rail 108. Shown in FIG. 1 as extending to a left side of work machine 100 toward power rail 108, conductor rod 106 may alternatively be arranged to extend to a right side (along the −Y axis) and at any desired angle from work machine 100 such that conductor rod 106 may be coupled to power rail 108 for obtaining electrical power.

As embodied in FIG. 1, conductor rod 106 includes a cylinder portion 109 mounted to frame 103 of work machine 100. Cylinder portion 109 has a hollow interior and may be a conductive metal having suitable mechanical strength and resiliency, such as aluminum. Within cylinder portion 109, an extension 110 is retained. Extension 110 is slidably engaged within cylinder portion 109 of conductor rod 106 such that it may be extended or retracted axially, i.e., along the Y axis in FIG. 1, to adjust the reach of conductor rod 106. Specifically, in a retracted position, extension 110 is caused to slide within cylinder portion 109 of conductor rod 106 such that a length of conductor rod 106 roughly spans the width of work machine 100. A junction 112 serves as the interface between extension 110 and cylinder portion 109, which is the main body of conductor rod 106. When extension 110 is fully retracted or collapsed into cylinder portion 109, junction 112 essentially becomes the left edge of conductor rod 106. On the other hand, when extension 110 is extended from cylinder portion 109 of conductor rod 106, extension 110 may reach from work machine 100 to above or near power rail 108 on the side of haul route 101.

Within, and possibly including cylinder portion 109, conductor rod 106 has a series of electrical conductors passing longitudinally, i.e. along the Y axis in FIG. 1, at least from a base 122 at a proximal end to a tip 124 at a distal end. Typically, the conductors within conductor rod 106 are formed of a metallic material. Moreover, as with cylinder portion 109, the material for conductors within conductor rod 106 typically have suitable mechanical strength and resiliency to permit their stable extension from work machine 100 to above power rail 108 at the side of haul route 101. In some examples, the conductors are concentric tubes, or hollow cylinders, of solid metal such as aluminum nested together and sized to provide electrical capacity sufficient for powering work machine 100. Tubular conductors within extension 110 slidably engage with corresponding tubular conductors in the portion of conductor rod 106 mounted on work machine 100. This engagement while the tubes slide ensures electrical continuity during extension or retraction of conductor rod 106.

At a distal end of extension 110 at tip 124 within conductor rod 106, a connector assembly 114 provides an interface to power rail 108 via trailing arms 116 and contactor 118. The arrangement of connector assembly 114, trailing arms 116, and contactor 118 of FIG. 1, which are collectively also referred to as a terminal assembly, are described in further detail in FIGS. 2-4. Power rail 108 is typically arranged along a side of haul route 101, and work machine 100 traverses haul route 101 substantially in parallel with power rail 108. Thus, in reference to FIG. 1, power rails 108 and a travel path for work machine 100 are substantially in parallel with each other and with the X axis. Contactor 118 is configured to maintain an electrical connection with power rail 108 while sliding along its surface in the direction of the X axis as work machine 100 moves.

In some examples, trailing arms 116 are conductors coupled to contactor 118, each conducting voltage and current at a different electrical pole for respective conductors within conductor rod 106. In operation, electrical power is accessed from power rail 108 via contactor 118, which remains in contact during movement of work machine 100, and the electrical power is conducted through trailing arms 116 into connector assembly 114.

From connector assembly 114, the electrical power is conveyed at tip 124 through the nested tubular conductors within extension 110 and cylinder portion 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for controls between work machine 100 and conductor rod 106. In some examples, head-end interface 120 includes passageways to control mechanical operation of conductor rod 106, such as for pressurized air of a pneumatic control system to extend and retract extension 110. In other examples, head-end interface 120 includes passageways for signals to communicate with electronic controls.

Figure 2:
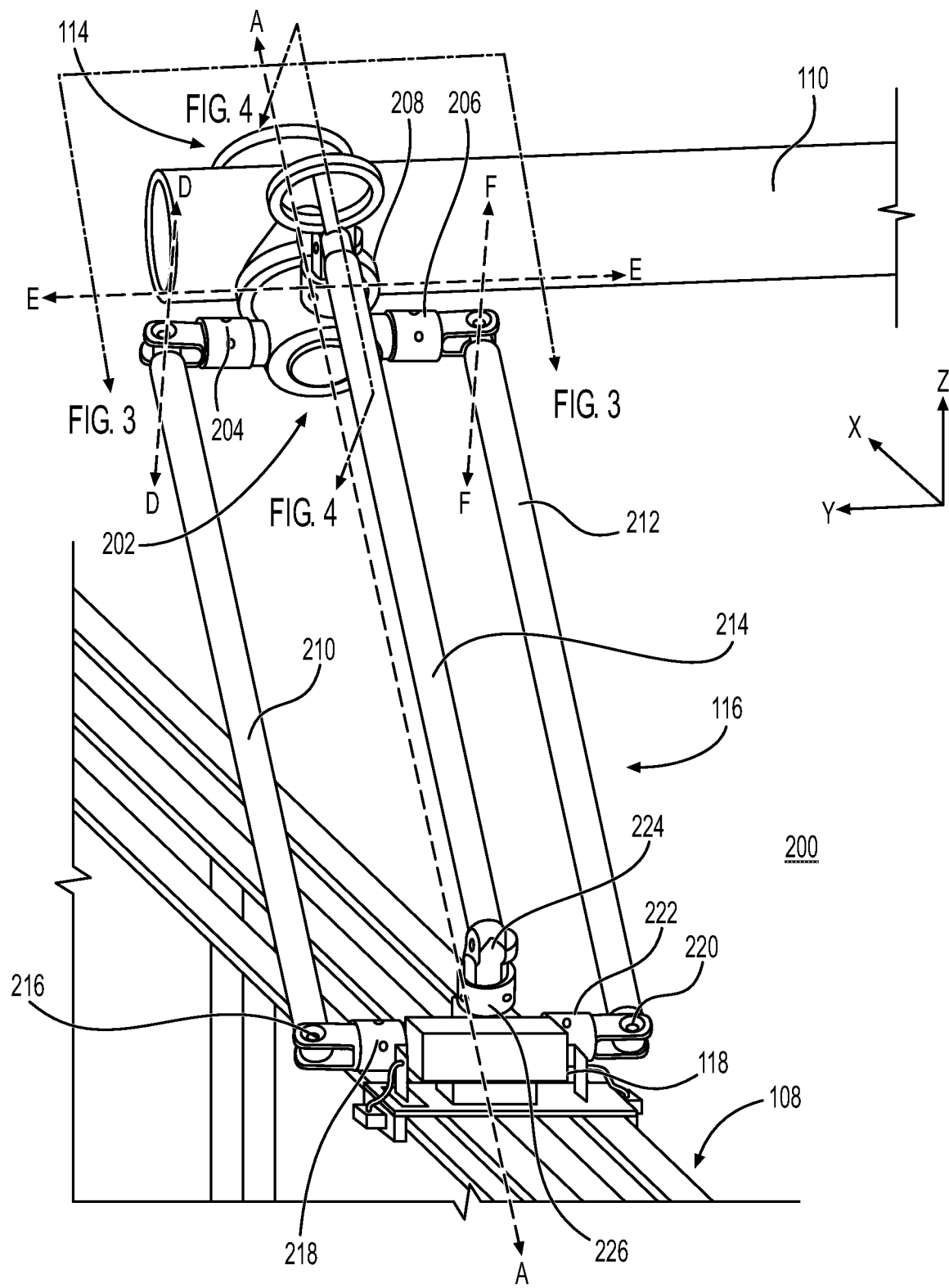
FIG. 2 is a partial isometric rear view of a conductive rod, first connector, and trailing arms in accordance with an example of the present disclosure.
Figure 3:
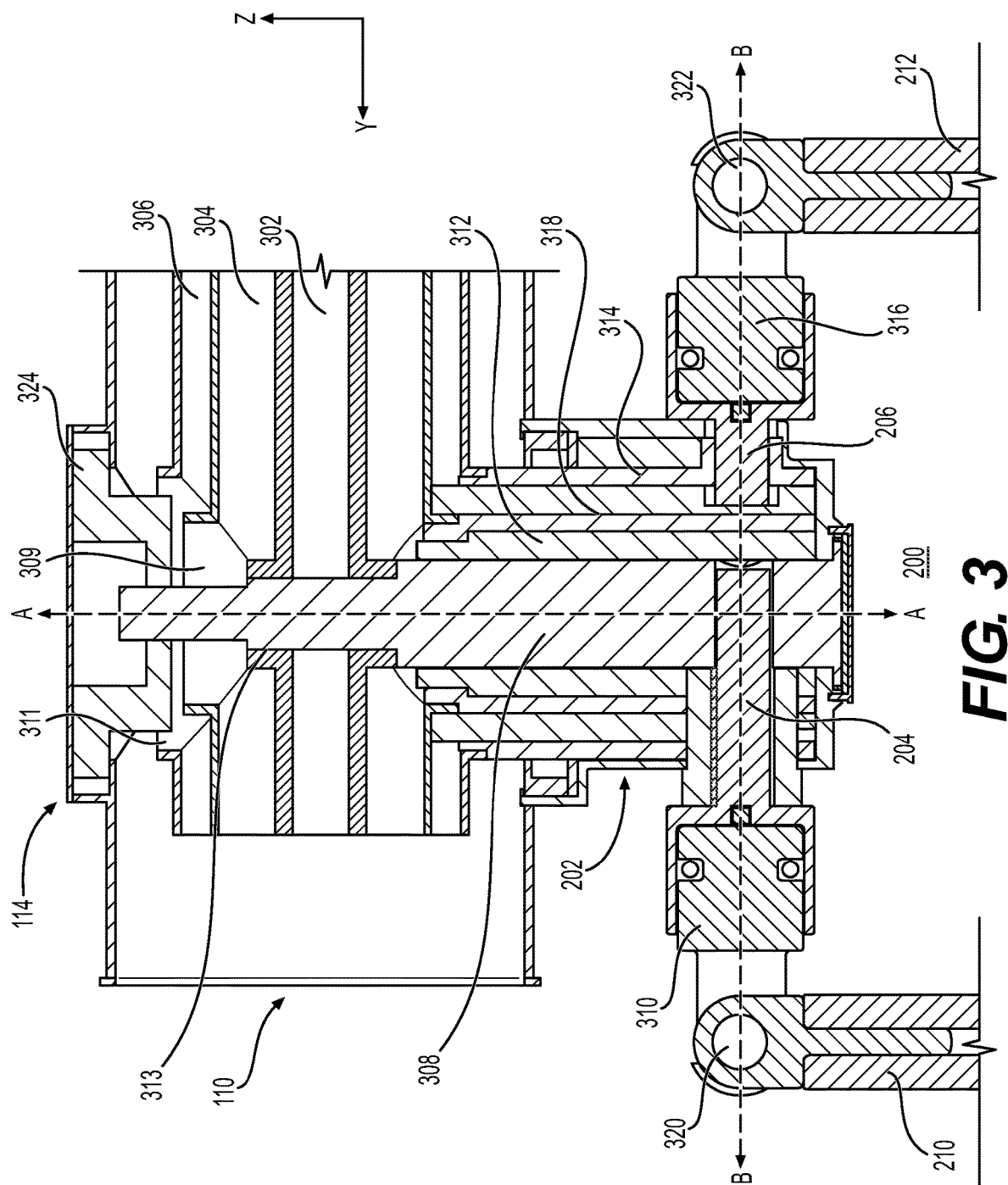
FIG. 3 is longitudinal section of the conductive rod, connector, and trailing arms of FIG. 2 in accordance with an example of the present disclosure.
Figure 4:
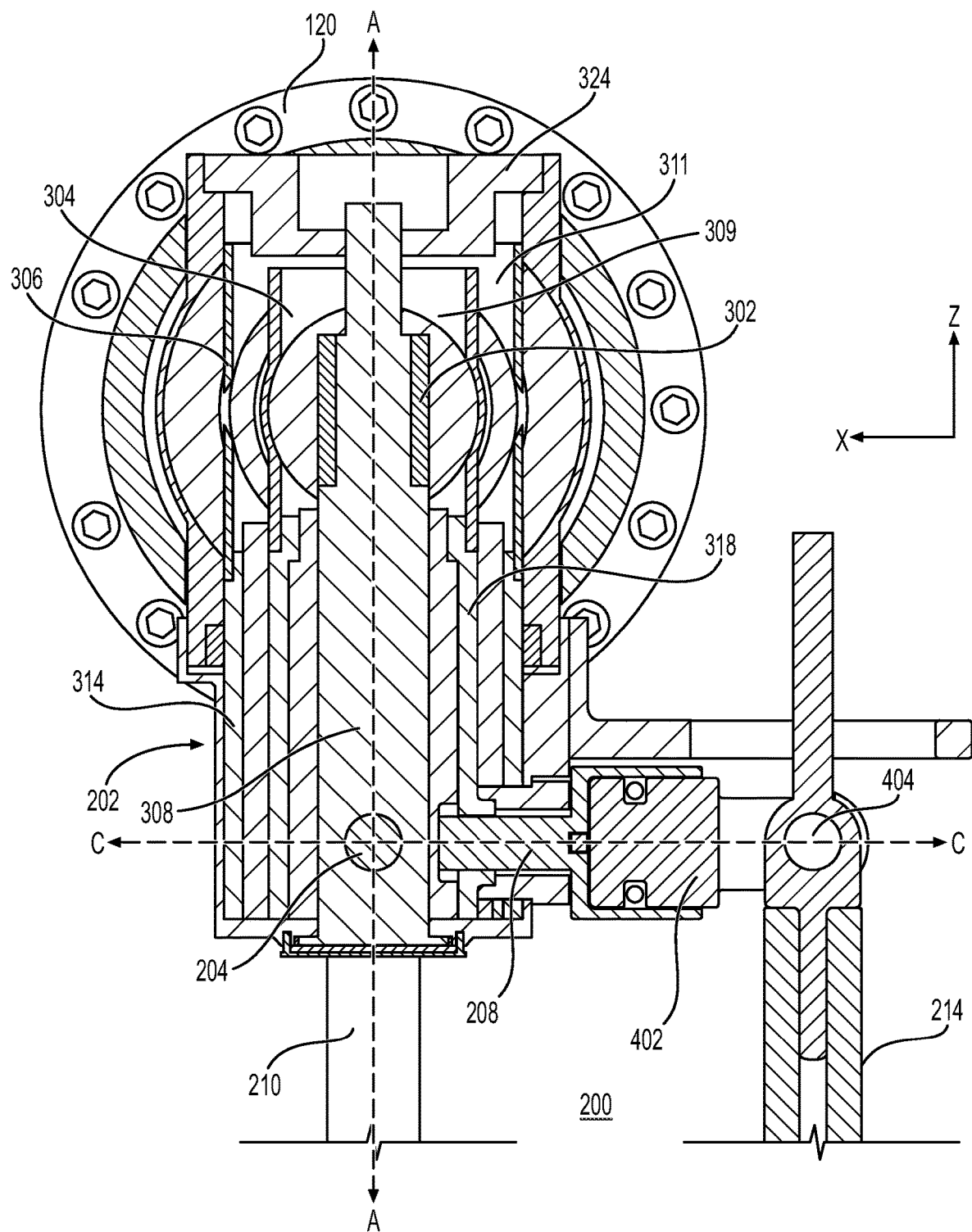
FIG. 4 is cross section of the conductive rod, connector, and trailing arms of FIG. 2 in accordance with an example of the present disclosure

Connector assembly 114 not only provides electrical connection between the conductors within extension 110 of conductor rod 106 and trailing arms 116, but also accommodates the various changes in relative position between power rail 108 and work machine 100 during travel along haul route 101. Those changes in relative position can include multiple deviations, such as those occurring laterally (work machine 100 and connector assembly 114 moving in the Y axis relative to contactor 118), vertically (work machine 100 and connector assembly 114 moving in the Z axis relative to contactor 118), and angularly (work machine 100 and connector assembly 114 moving in the X-Y plane angularly around the Z axis). One or all of these deviations could occur as a driver steers work machine 100 along haul route 101, work machine 100 responds to an uneven or pocked roadway, or an orientation of power rail 108 varies with respect to work machine 100. FIGS. 2-4 are discussed collectively below and illustrate details of an example terminal assembly 200 suitable for accommodating multiple deviations in position between work machine 100 and contactor 118.

FIG. 2 is a view from a side of power rail 108 opposite work machine 100 facing generally forward (i.e., along the X axis), which shows a terminal assembly 200 from a back side of extension 110. As shown in FIG. 2, power rail 108 contains three conductors. In one example, two of the conductors provide electrical power at different polarities while the third conductor provides a reference of 0 volts. In other examples, the conductors can provide AC voltage at three different polarities or power rail 108 and conductor rod 106 can contain fewer or more than three conductors. Contactor 118 is electrically coupled to power rail 108 and slides along its surface to maintain an electrical connection. In some implementations, contactor 118 may be latched or slidably interlocked into power rail 108 rather than having a connection on the upper surface of power rail 108. Ultimately, for purposes of the present disclosure, contactor 118 provides an interface between the respective conductors of power rail 108 and trailing arms 116. As shown in FIG. 2, connector assembly 114 within terminal assembly 200 is integrated into a distal end of extension 110. A rotational interface 202 of connector assembly 114 exits a bottom portion of extension 110 and culminates in first lug 204, third lug 206, and second lug 208. First lug 204, third lug 206, and second lug 208 respectively attach through connector assembly 114 to corresponding conductors within extension 110 and provide a separate conductive path between those conductors and contactor 118.

While FIG. 2 shows an external view of terminal assembly 200, FIGS. 3 and 4 illustrate different sectional views. FIG. 3, which is a longitudinal section of a portion of terminal assembly 200, reveals an arrangement of nested concentric conductors within extension 110. In this example, first conductor 302 is positioned at an axial center of extension 110 along the Y axis and is surrounded concentrically by second conductor 304. Further, third conductor 306 surrounds second conductor 304. At least second conductor 304 and third conductor 306 are tubes, meaning they are substantially cylindrical and hollow in form having an outer surface and an inner surface surrounding a central longitudinal axis. As shown, first conductor 302, second conductor 304, and third conductor 306 are formed of conductive material, typically aluminum, or a similar metal or alloy with high electrical conductivity and mechanical strength. An outer covering or sheath of extension 110 surrounds third conductor 306. Depending on the implementation, regions between the concentric conductors may be partially or completely filled with insulative material, other substance, or air. First conductor 302, second conductor 304, and third conductor 306 provide part of a path for conducting the electrical power from power rail 108 to work machine 100.

Connector assembly 114 includes a series of orthogonal conductors positioned to intersect with first conductor 302, second conductor 304, and third conductor 306, respectively. With respect to first conductor 302, a first pin 308 extends laterally through extension 110 along an axis A-A (FIGS. 3 and 4), substantially along the Z axis. In some examples, first pin 308 is a longitudinal piece of metal, such as aluminum, resembling a dowel or a pin that may be solid or hollow. First pin 308 is configured to pass through extension 110 transversely or radially with respect to a longitudinal axis of extension 110 and at a length that it substantially traverses the diameter of extension 110. Second conductor 304 has an opening 309, and third conductor 306 has an opening 311 that each provides clearance for first pin 308 to pass through extension 110 without contacting those conductors (FIG. 4). First conductor 302 has a passageway 313 for receiving and contacting first pin 308. Within opening 309, first pin 308 freely rotates around axis A-A while maintaining an electrical coupling between first pin 308 and first conductor 302. In some examples, to assist with both the rotation and the coupling, a liquid metal such as Galinstan may be added to the joint within opening 309. Accordingly, first pin 308 extends substantially perpendicular to first conductor 302, starting from a rotational interface 202 at an exterior of extension 110 and passing substantially through a diameter of extension 110. A cap 324 of insulative material such as plastic seals the region surrounding the top of first pin 308. Separator 312 surrounds and insulates first pin 308 within rotational interface 202.

In the example illustrated in FIG. 3, first lug 204 intersects with a lower portion of first pin 308 within rotational interface 202. In some examples, the intersection is a threaded and tight fit engagement. As illustrated in FIG. 3, first lug 204 intersects with first pin 308 substantially at a right angle, such that first lug 204 aligns with an axis B-B that may be parallel to a longitudinal axis of extension 110 (shown as the Y axis in the figures). A first shaft 310 mates with a socket joint within first lug 204 and provides rotational movement within the socket about the axis B-B. While first shaft 310 is shown as being rotatable about axis B-B with a socket of first lug 204, other mechanisms for permitting movement of first shaft 310 are feasible. For instance, a ball-and-socket joint could achieve similar results. At an opposite end of first shaft 310 from the socket joint, first shaft 310 attaches to first arm 210 through a first hinge 320. First hinge 320 enables first arm 210 to rotate around an axis D-D extending through first arm 210, as shown in FIG. 2.

At its opposite end, first arm 210 connects to a similar configuration within contactor 118. In some examples, the components within 118 associated with trailing arms 116 have axes of rotation parallel to those within contactor assembly 114, such as around axes B-B, C-C, D-D, E-E, and F-F, but the additional axes within contactor assembly 114 are not shown on FIG. 2 for simplicity. Namely, in some examples, contactor 118 includes a first contactor hinge 216 and first contactor lug 218. Connected with first arm 210, first contactor hinge 216 provides rotation about an axis parallel to axis D-D. First contactor lug 218 enables rotation about an axis through its center, which in some examples is parallel to axis B-B in FIG. 3. Mechanically, first contactor lug 218, first contactor hinge 216, first arm 210, first hinge 320, first shaft 310, first lug 204, and first pin 308 enable flexible and versatile movement through the combined movement of the joints between first conductor 302 and contactor 118. Electrically, the connections of these components provide a path for the conduction of electrical power from one of the conductors in power rail 108 to first conductor 302 within extension 110.

Similarly, connector assembly 114 in some examples includes another conductive path extending from contactor 118 to second conductor 304. Referring to FIG. 4, second pin 318 is tubular in shape and is situated orthogonally to second conductor 304 and concentrically around axis A-A. Second pin 318 contacts second conductor 304 and may freely rotate about axis A-A, providing electrical conductivity between second conductor 304 and second lug 208, which is connected at the portion of second conductor 304 within rotational interface 202. Second lug 208 is positioned angularly to first lug 204, which in the example illustrated is substantially a right angle. Accordingly, second lug 208 and second shaft 402, which are coupled through a rotational joint, are aligned along an axis C-C. In some examples, as in FIG. 2, axis A-A, axis B-B, and axis C-C are perpendicular to each other. Second lug 208 with second shaft 402 attaches to second arm 214 through a second hinge 404. Second hinge 404 enables rotation of second arm 214 around an axis E-E, which may be substantially perpendicular to axis D-D. Finally, second arm 214 extends to contactor 118 where it is connected via a second contactor hinge 224 and a second contactor lug 226. Second contactor hinge 224 is configured to rotate around an axis substantially parallel to axis E-E. Second contactor hinge 224 is connected through a rotational socket to second contactor lug 226, which is configured to rotate around an axis through its center. In some examples, that rotational axis for second contactor lug 226 is parallel to axis C-C. Electrically, the connections of second contactor lug 226, second contactor hinge 224, second arm 214, second hinge 404, second lug 208, and second pin 318 provide a path for the conduction of electrical power from a second conductor in power rail 108 to second conductor 304 within extension 110.

Referring again to FIG. 3, a third pin 314 extends laterally through extension 110 and concentrically around axis A-A. In some examples, third pin 314 is tubular in shape and connects with third conductor 306. As part of rotational interface 202, third pin 314 freely rotates around axis A-A while maintaining an electrical coupling with third conductor 306. Accordingly, third pin 314 substantially forms a right angle with third conductor 306 and is in parallel with first pin 308. Within rotational interface 202, third pin 314 on one side includes an opening for the passage of first lug 204 and, on an opposite side, is connected to third lug 206. In the implementation in FIG. 3, third lug 206 intersects with third pin 314 substantially at a right angle, such that third lug 206 is aligned with first lug 204 along axis B-B. A third shaft 316 mates with a socket joint within third lug 206 and provides rotational movement within the socket around the axis B-B. As with first lug 204 and first shaft 310, other mechanisms for enabling rotation of third shaft 316 around axis B-B may be employed besides a socket joint.

At an opposite end of third shaft 316 from the socket joint, third shaft 316 attaches to third arm 212 through a third hinge 322. Third hinge 322 enables third arm 212 to rotate around an axis F-F extending through third arm 212 as shown in FIG. 2. Third arm 212 is also attached to contactor 118 at its distal end via a third contactor hinge 220. Similar to first contactor hinge 216, third contactor hinge 220 enables rotation of third arm 212 around an axis parallel to axis F-F. Third contactor hinge 220 is connected through a rotational socket to third contactor lug 222, which enables rotation around an axis through its center. Electrically, the connections of third contactor lug 222, third contactor hinge 220, third arm 212, third hinge 322, third shaft 316, third lug 206, and third pin 314 provide a path for the conduction of electrical power from another of the conductors in power rail 108 to third conductor 306 within extension 110.

Overall, as shown in FIGS. 2-4, terminal assembly 200 with connector assembly 114 and contactor 118 provide an apparatus configured to have the ability to move in multiple dimensions. Collectively, the various joints within connector assembly 114, and to some extent also within contactor 118, provide multiple degrees of freedom for extension 110 to move relative to contactor 118. As work machine 100 moves forward (in the direction of the X axis), trailing arms 116 and contactor 118 trail behind extension 110. If the position of extension 110 changes with respect to the position of contactor 118, connector assembly 114 permits trailing arms 116 to move in several directions and maintain the connection between contactor 118 and power rail 108. Specifically, to accommodate minor lateral displacement (work machine 100 and connector assembly 114 moving in a direction substantially parallel to the Y axis relative to contactor 118), first hinge 320, second hinge 404, third hinge 322 in connector assembly 114 and, for some examples first contactor hinge 216, second contactor hinge 224, and third contactor hinge 220 in contactor 118, all permit rotation around axes that allow lateral movement without imparting stress on contactor 118 that might lead to detachment from power rail 108. For vertical displacement (work machine 100 and connector assembly 114 moving in a direction substantially parallel to the Z axis relative to contactor 118), first shaft 310, second shaft 402, and third shaft 316 in connector assembly 114 and, for some examples first contactor lug 218, second contactor lug 226, and third contactor lug 222 in contactor 118, all permit rotation around axes that allow vertical movement without imparting stress on contactor 118 that might lead to detachment from power rail 108. Namely, these axes for vertical displacement are axis B-B and axis E-E. And for angular displacement (work machine 100 and connector assembly 114 moving in the X-Y plane angularly around the Z axis), rotational interface 202 within connector assembly 114 is configured to enable rotation around axis A-A, which together with rotation around others of the joints discussed, permits minor angular movement of extension 110 with respect to power rail 108 without causing detachment of contactor 118 and interruption of the electrical conduction to work machine 100.

Figure 5:
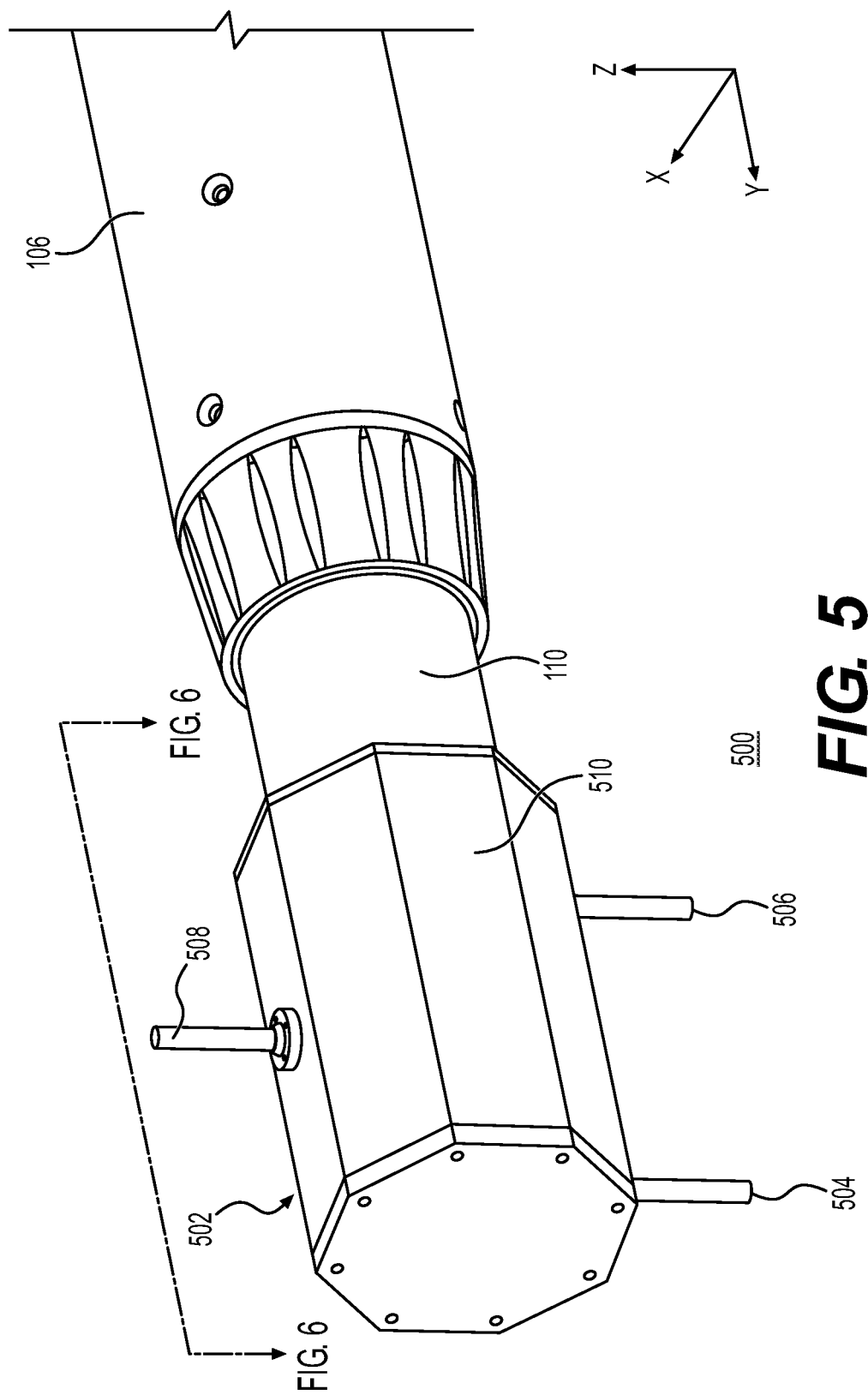
FIG. 5 is a partial isometric rear view of a conductive rod and second connector in accordance with an example of the present disclosure
Figure 6:
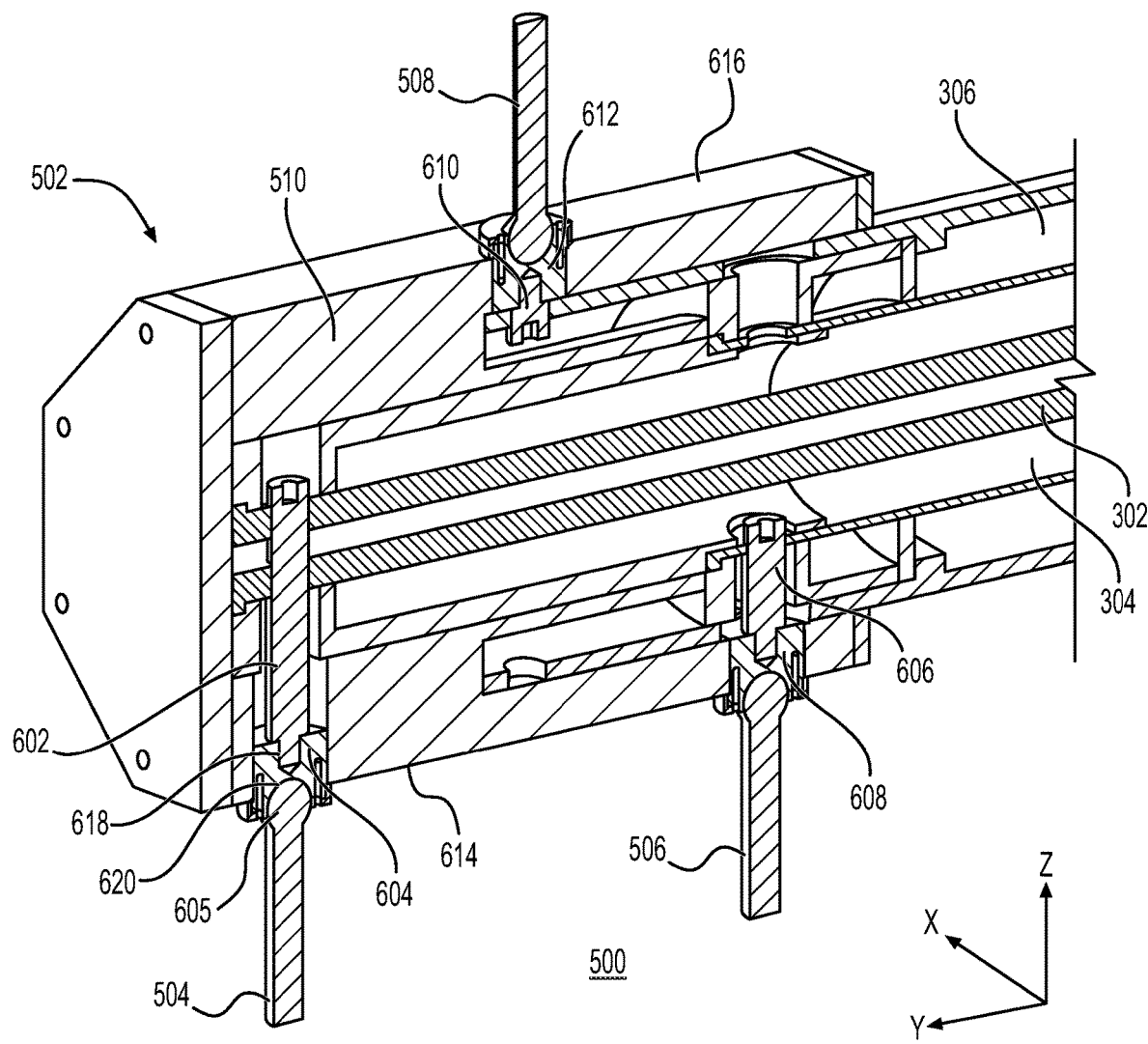
FIG. 6 is an isometric view of a longitudinal section of the conductive rod and connector of FIG. 5 in accordance with an example of the present disclosure.
Figure 7:
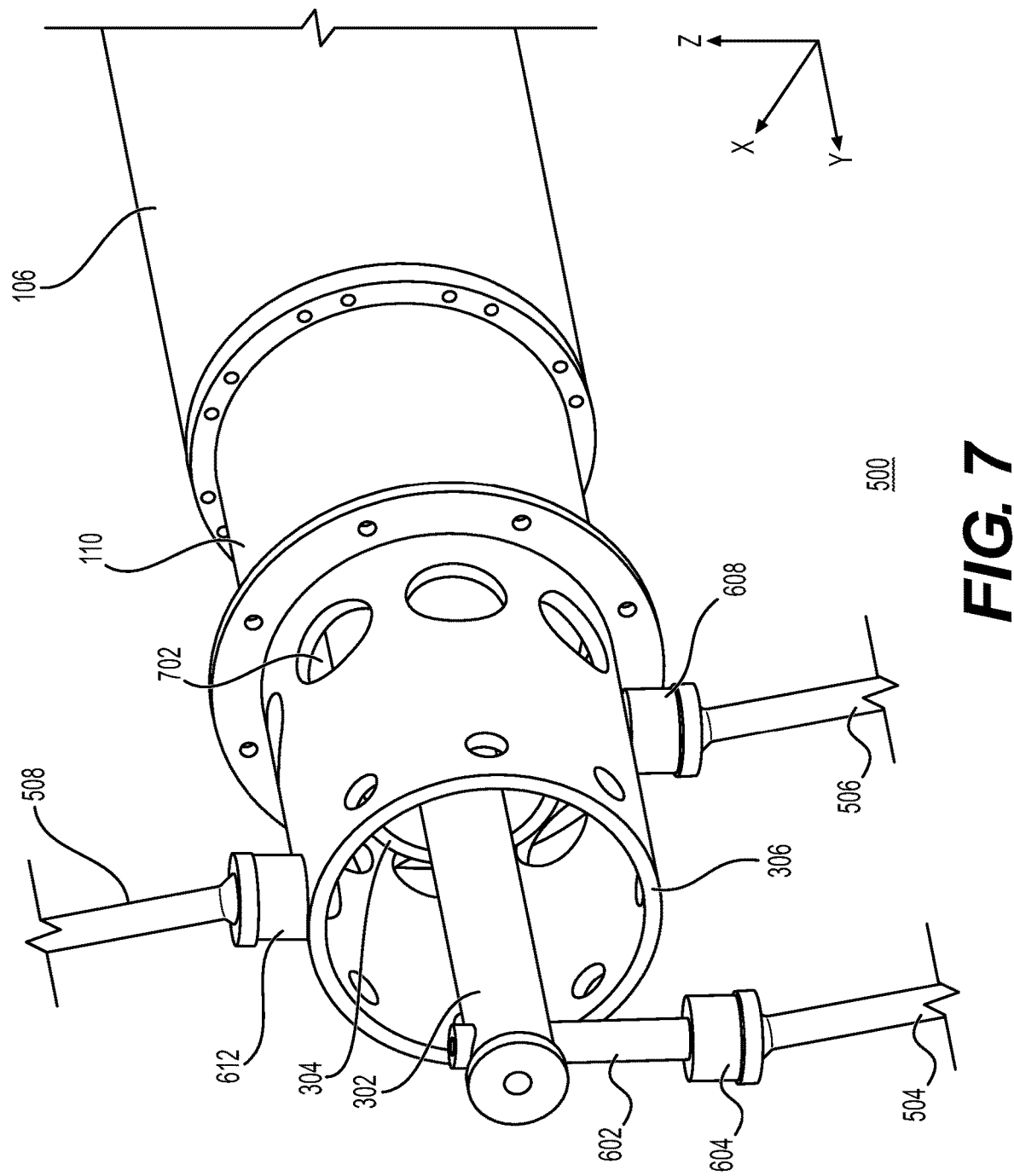
FIG. 7 is a partial isometric rear view of a conductive rod and second connector with an insulative cap removed in accordance with an example of the present disclosure.

While FIGS. 2-4 illustrate a first example of connector assembly 114, FIGS. 5-7 depict a second example of a connector assembly 500 including a connection assembly for use with work machine 100. As with connector assembly 114, second connector 502 includes structural features for accommodating multiple deviations in position between work machine 100 and contactor 118. FIG. 5 is a view from an end of conductor rod 106 facing forward, which shows a back side of extension 110 with respect to a direction of forward travel of work machine 100 (along the X axis). As shown in FIG. 5, second connector 502 is positioned at a distal end of extension 110 and includes three terminals: first lug 504, second lug 506, and third lug 508. Each of these terminals provides a connection point for providing electrical conduction through conductor rod 106 to work machine 100. Second connector 502 is encased by cover 510, which is an insulative material such as plastic, in the implementation illustrated. In one example, first lug 504 may be connected to a source of +1500 VDC, second lug 506 may be connected to a source of −1500 VDC, and third lug 508 may be connected to a reference voltage such as 0 VDC. Although not shown in the figures, the terminals may be connected to contactor 118 using a version of first arm 210, second arm 214, and third arm 212 illustrated in FIG. 2. Other types of physical connections between second connector 502 and contactor 118 may be used to achieve electrical conduction and multiple degrees of free movement between extension 110 and contactor 118 and will be within the knowledge of those skilled in the field.

FIG. 6 illustrates a longitudinal section of second connector 502 depicted in FIG. 5. As shown, a first pin 602 is positioned within second connector 502 in a substantially orthogonal relationship with first conductor 302. First pin 602 is a conductive material, such as aluminum or copper, and in some embodiments resembles a dowel or pin in shape. At a proximal end, first pin 602 is connected to first conductor 302 to provide electrical conductivity between the parts. At its distal end, first pin 602 is connected to a first socket joint 604. First socket joint 604 is also made of an electrically conductive material, such as aluminum or copper, and includes an orifice 618 for receiving first pin 602 at one end and a bowl-shaped concavity 620 at an opposite end. Concavity 620 functions as a socket joint and receives ball 605 of first lug 504. The mating of first socket joint 604 and ball 605 creates a ball-and-socket joint, which permits rotational and pivotal movement of first lug 504. Specifically, first lug 504 may twist and rotate within a semispherical space with respect to a surface 614 of second connector 502 where first lug 504 and first socket joint 604 meet. That is, in some examples, first lug 504 can be moved in a manner that its tip farthest from surface 614 can traverse a hemisphere bounded at its equator by second connector 502.

Similarly, a second pin 606 is positioned within second connector 502 in a substantially orthogonal relationship with second conductor 304. In the example of FIG. 6, second pin 606 and first pin 602 are substantially parallel to each other, exiting a bottom region of extension 110. Second pin 606 is a conductive material and is connected to second socket joint 608. As with first socket joint 604, second socket joint 608 is electrically conductive and includes an orifice at one end for receiving second pin 606 at one end and a socket joint at the opposite end. Second lug 506 has an enlarged end in the general shape of a ball that is received in the socket joint of second socket joint 608. As a result, as with first lug 504 and first socket joint 604, second lug 506 is free to pivot and rotate within second socket joint 608 within a semi-spherical space with respect to surface 614 of second connector 502 where second lug 506 and second socket joint 608 intersect.

As well, third lug 508 is connected to third conductor 306 via a third pin 610 and a third socket joint 612, as shown in FIG. 6. In some implementations, third socket joint 612 is affixed directly to third conductor 306 without the need for third socket joint 612, as third conductor 306 is close to an outer surface of extension 110. Third socket joint 612 includes a socket joint for receiving an end of third lug 508 having a general spherical shape with a diameter larger than the width of a shaft on the remainder of third lug 508. The enlarged spherical shape, joined to the socket cavity within third pin 610, enables semi-spherical movement of third lug 508 around surface 616 of second connector 502. In the example illustrated, third lug 508 is parallel to first lug 504 and second lug 506, while extending in an opposite direction (in the direction of the +Z axis compared with the −Z axis).

Referring to the examples of FIGS. 6 and 7, first conductor 302, second conductor 304, and third conductor 306 have different ending positions or terminations longitudinally within extension 110 to facilitate engagement with first pin 602, second pin 606, and third pin 610. FIG. 7 provides an isometric view of a version of second connector 502 with a perspective similar to FIG. 6 with cover 510 removed. For instance, first pin 602 extends the farthest of the conductors (farther along the Y axis), reaching to near the distal end of extension 110. Second conductor 304 and third conductor 306 end at positions closer to the proximal end of extension 110. In this way, first pin 602 can pass laterally through second connector 502 without intersecting with either second conductor 304 or third conductor 306. In the examples of FIGS. 6 and 7, third conductor 306 extends farther longitudinally than second conductor 304 such that third pin 610 (and third socket joint 612 if third pin 610 is not used) can pass directly to the outer surface of 512 without intersecting with either first conductor 302 or third conductor 306. Second conductor 304 includes one or more apertures 702 around its perimeter (FIG. 7), through which second pin 606 may pass to reach the outer surface of second connector 502. Other arrangements or orderings of the conductors and their termination locations may be selected to comply with a desired implementation and are within the knowledge of those of ordinary skill in the art.

Therefore, as with the example in FIGS. 2-4, the example connector assembly 500 in FIGS. 5-7 provides a structure configured to enable movement of extension 110 in multiple dimensions with respect to a contactor 118 and power rails 108. Collectively, the ball-and-socket joints within each of first socket joint 604, second socket joint 608, and third socket joint 612 provide multiple degrees of freedom for the affiliated first lug 504, second lug 506, and third lug 508 to move relative to contactor 118 where they may be attached. Equivalent connections at contactor 118 (not shown) or connections on contactor 118 such as depicted for the first example in FIG. 2 can coordinate with connector 502 to increase these degrees of freedom. For instance, if the position of work machine 100 changes in a lateral direction with respect to contactor 118, for example, the ball-and-socket joints permit corresponding lateral movement at least for first lug 504, second lug 506, and third lug 508 to accommodate the change. Similarly, if extension 110 becomes displaced vertically with respect to contactor 118, first lug 504, second lug 506, and third lug 508 can pivot upwardly or downwardly to accommodate the change and shield contactor 118 from forces that might otherwise detach contactor 118 from power rail 108. And if extension 110 were to move angularly with respect to contactor 118, the ball-and-socket joints permit the movement in a semi-spherical space for each of first lug 504, second lug 506, and third lug 508 such that the movement can be accommodated without forcing equivalent movement by contactor 118 on power rail 108. The attachment mechanism chosen between second connector 502 and contactor 118 can impact the range of motion available for extension 110 and is subject to routine experimentation to those of ordinary skill in the field. Accordingly, connector assembly 500 of FIGS. 5-7 can improve continued attachment of contactor 118 with power rails 108 as work machine 100 travels along haul route 101, even as extension 110 moves laterally, vertically, or angularly with respect to power rails 108, ensuring that work machine 100 remains attached to a supply of electrical power from power rails 108.

Figure 8:
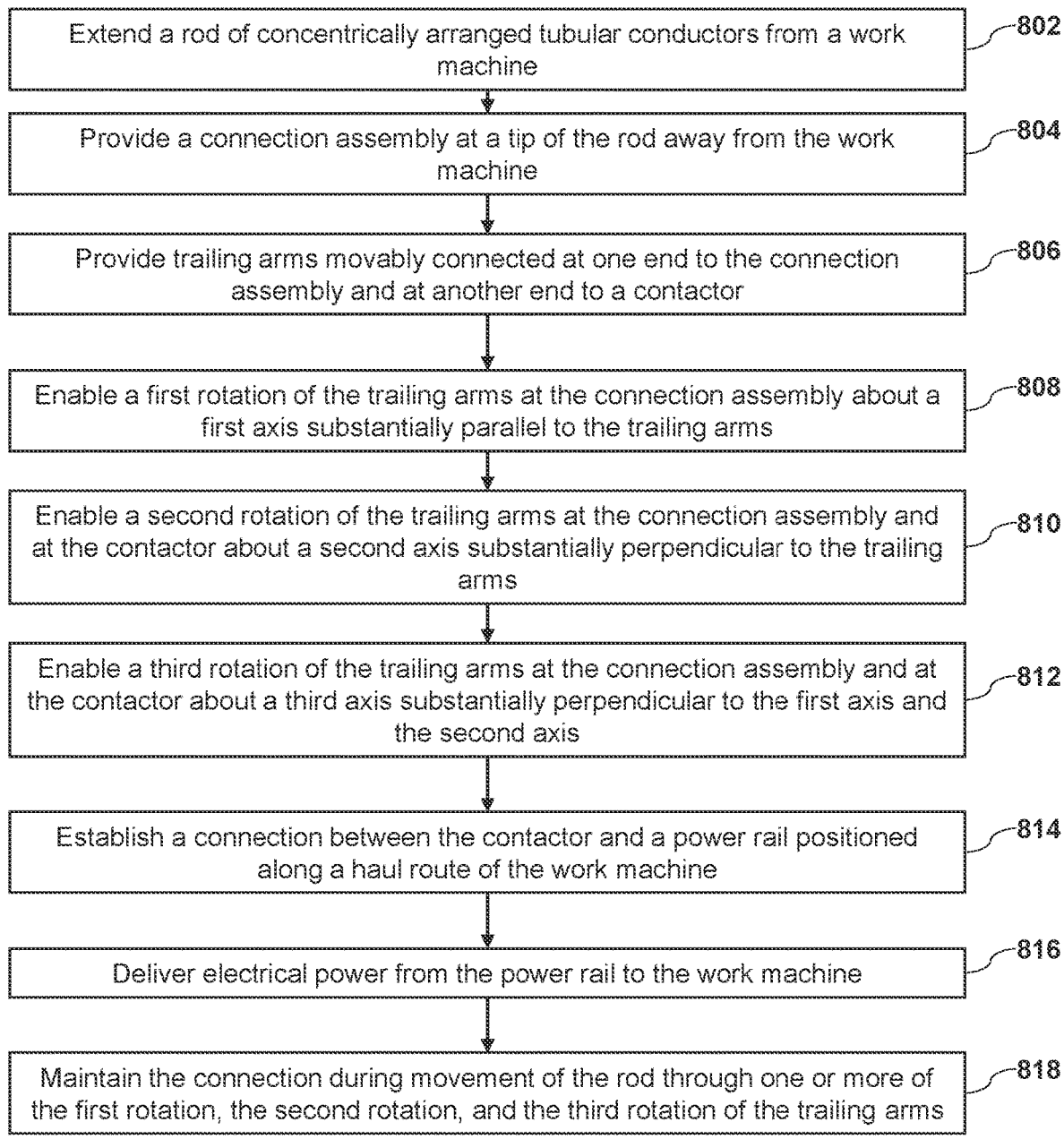
FIG. 8 is a flowchart depicting a method of providing electrical power to a work machine during movement in accordance with an example of the present disclosure.

Turning from the structure of terminal assembly 200, connector assembly 114, and connector assembly 500 as illustrated in FIG. 1-7 to a method involving these structures, FIG. 8 is a flowchart of a representative method for powering a work machine from a power rail along a side of a haul route. Generally embodied as 800 in FIG. 8, the method begins with steps 802 and 804 of extending a rod of concentrically arranged tubular conductors from a work machine and providing a connection assembly at a tip of the rod away from the work machine. As discussed in detail above, work machine 100, such as a hauling truck at a mining site, can include conduction rod 106 with a plurality of conductive tubes, typically made of an aluminum alloy, arranged concentrically around a longitudinal axis. Near a tip 124 of conduction rod 106 distal from work machine 100, connection assembly 114 is integrated into conduction rod 106, as reflected in FIG. 1.

Further, in a step 806, trailing arms are provided that are movably connected at one end to the connection assembly and at another end to a contactor. As implemented in the example of FIG. 1, contactor 118 is a structure that enables mechanical and electrical coupling with metal rails, such as power rails 108, arranged along a side of a haul route 101. Trailing arms 116 follow at an angle behind conductor rod 106 as work machine 100 travels on haul route 101 and provide a bridge between connection assembly 114 and contactor 118. A step 808 in method 800 entails enabling a first rotation of the trailing arms at the connection assembly around a first axis substantially parallel to the trailing arms. As embodied in FIG. 2, a first rotation about a first axis may include a rotation of connection assembly 114 around axis A-A. A further step 810 includes enabling a second rotation of the trailing arms at the connection assembly and at the contactor about a second axis substantially perpendicular to the trailing arms. FIG. 3 illustrates for one example that connection assembly 114 may include components to enable the rotation of trailing arms 116 around an axis B-B or axis C-C that are substantially perpendicular to axis A-A. FIG. 8 further indicates to enable a third rotation of the trailing arms at the connection assembly and at the contactor about a third axis substantially perpendicular to the first axis and the second axis (step 812). FIGS. 2 and 3 illustrate that hinge 320 and hinge 322 can provide additional rotation about axes D-D and E-E.

In further steps of method 800, a connection is established between the contactor and a power rail arranged substantially in parallel with a haul route of a work machine (step 814), and electrical power is delivered from the power rail to the work machine (step 816). The connection between contactor 118 and power rails 108, as shown in FIG. 1, provides access for work machine 100 to electrical power present on power rails 108. Finally, step 818 of method 800 includes maintaining the connection during movement of the rod through one or more of the first rotation, the second rotation, and the third rotation of the trailing arms. Movement of work machine 100 along haul route 101 can lead to angular, vertical, or lateral motion of extension 110 relative to contactor 118. In any of these dimensions, one or more of the axes of rotation within terminal assembly 200 permits trailing arms 116 to move as well and to compensate for the relative motion. Accordingly, terminal assembly 200 can absorb forces arising from the movement of extension 116 and avoid those forces being imparted on contactor 118, which results in the contactor 118 maintaining its connection to power rails 108 and delivering electrical power to extension 116 while work machine 100 travels along haul route 101.

Figure 9:
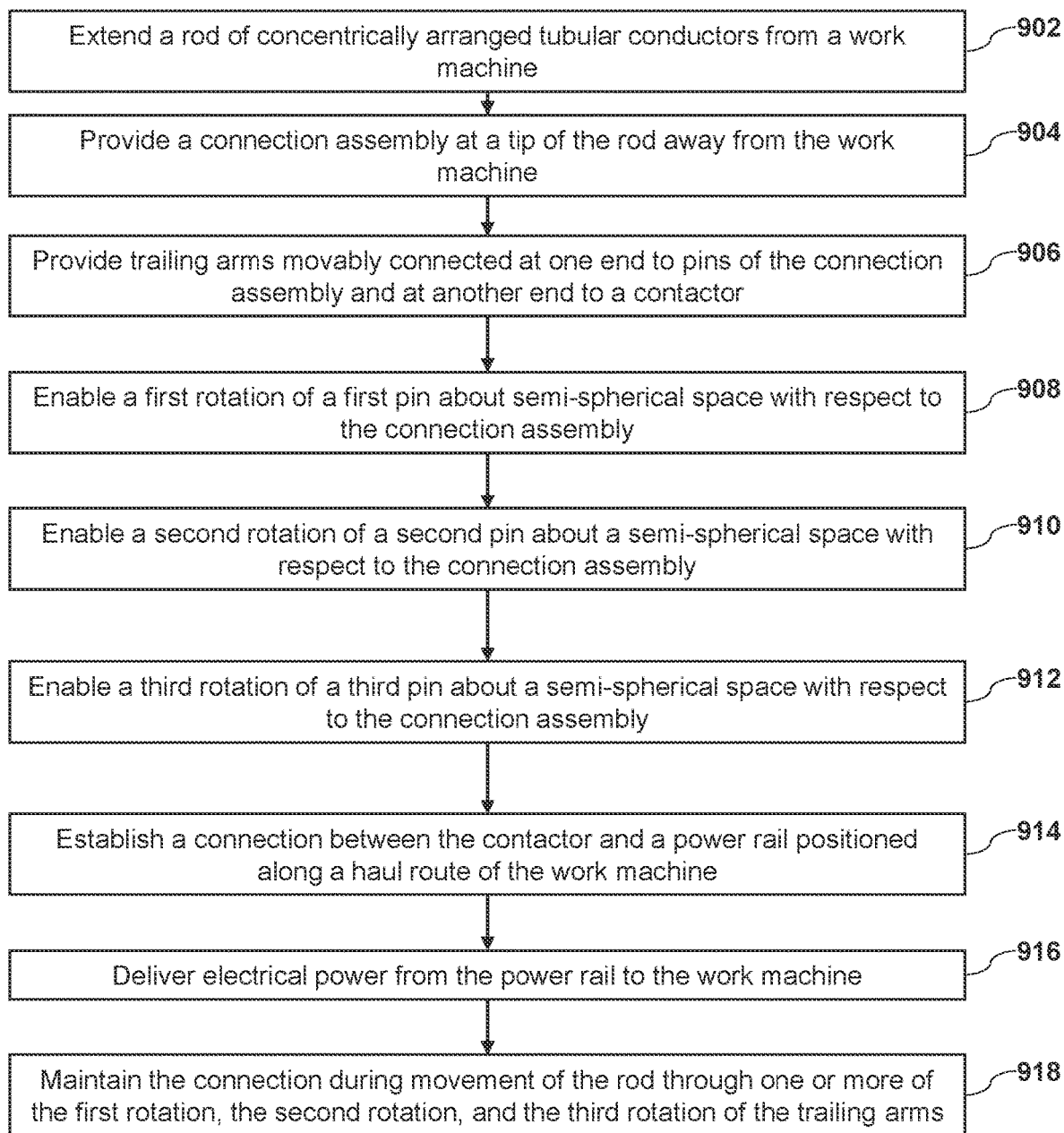
FIG. 9 is a flowchart depicting another method of providing electrical power to a work machine during movement in accordance with an example of the present disclosure.

Similar method steps may be employed with respect to connection assembly 500. Embodied as 900 in the flowchart of FIG. 9, a representative method for powering a work machine from a power rail along a side of a haul route can begin with steps 902 and 904, which are the same as steps 802 and 804 discussed above. A next step 906 entails providing trailing arms movably connected at one end to pins of the connection assembly and at another end to a contactor. As detailed above, connection assembly 500 includes pins 504, 506, and 508 that may be connected to trailing arms, whether trailing arms 116 or a similar implementation, to contactor 118. Contactor 118 may have similar pins within its structure for connection at to the trailing arms. Subsequent steps for method 900 entail enabling a first rotation of a first pin about semi-spherical space with respect to the connection assembly (step 908), enabling a second rotation of a second pin about a semi-spherical space with respect to the connection assembly (step 910), and enabling a third rotation of a third pin about a semi-spherical space with respect to the connection assembly (step 912). As illustrated in FIGS. 5-7, in some examples, pins 504, 506, and 508 are secured to connector 502 through socket joints, such as 604, 608, and 612. In these ball-and-socket configurations, pins 504, 506, and 508 are free to rotate around a semi-spherical space in response to angular or rotational forces applied against them.

In further steps of method 900, a connection is established between the contactor and a power rail arranged substantially in parallel with a haul route of a work machine (step 914), and electrical power is delivered from the power rail to the work machine (step 916). The connection between contactor 118 and power rails 108, as shown in FIG. 1, provides access for work machine 100 to electrical power present on power rails 108. Finally, step 918 of method 900 includes maintaining the connection during movement of the rod through one or more of the first rotation, the second rotation, and the third rotation of the trailing arms. Movement of work machine 100 along haul route 101 can lead to angular, vertical, or lateral motion of extension 110 relative to contactor 118. In any of these dimensions, the ball-and-socket arrangements for pins 504, 506, and 508 permit trailing arms connected to those pins to move in reaction to forces applied by extension 110. Accordingly, connector assembly 500 can help absorb forces arising from the movement of extension 110 and avoid those forces being imparted on contactor 118, which results in contactor 118 maintaining its connection to power rails 108 and delivering electrical power to extension 116 while work machine 100 travels along haul route 101.

Those of ordinary skill in the field will also appreciate that the principles of this disclosure are not limited to the specific examples discussed or illustrated in the figures. For example, while connector assembly 114 and second connector 502 have been discussed in the context of attachment to contactor 118 on the distal end of conductor rod 106, other uses for them are feasible. Each could be implemented on the proximal end of conductor rod 106 for making mechanical and electrical connection at work machine 100. Moreover, while the present disclosure address conductor rod 106 and terminal assembly 200 having three conductors, implementations have more or fewer conductors are contemplated. In addition, the principles disclosed are not limited to implementation on a work machine. Any moving vehicle deriving electrical power from a ground-based conductor rail could benefit from the examples and techniques disclosed and claimed.

INDUSTRIAL APPLICABILITY

The present disclosure provides a system for a moving machine having a conductor rod configured to convey multiple poles of electrical energy from an energized rail to the moving machine, where the conductor rod has tubular conductors successively arranged concentrically around a longitudinal axis. A terminal assembly positioned on the conductor rod proximate the energized rail includes conductive extensions successively arranged concentrically around a terminal axis transverse to the longitudinal axis of the conductor rod. Individual ones of the conductive extensions rotationally branch from respective ones of the tubular conductors and extend to an exterior of the conductor rod. Metal pins positioned transversely to the terminal axis can also rotate and are electrically connected to corresponding ones of the conductive extensions. Conductive arms connected through respective hinge joints to the rotatable pins are also connected to a contactor that slides on the energized rail. As a result, the terminal assembly enables multiple degrees of freedom for the conductor rod to move relative to the contactor, avoiding detachment of the contactor from the energized rail as the machine moves.

As noted above with respect to FIGS. 1-7, an example conductor rod and terminal assembly generally includes a conductor rod 106 with an extension 110 that is extendable or retractable from a work machine 100. Conductor rod 106 and extension 110 include concentrically arranged metal tubes, each configured to conduct a different pole of electrical power to work machine 100. A distal end of extension 110 has a connector assembly 114 that receives electrical power from a power rail 108. Specifically, a rotational interface 202 protrudes from a lateral side of extension 110 and contains concentrically arranged conductive pins, each of which rotationally connects with a corresponding conductor in extension 110. The pins are respectively connected with lugs that enable rotation around an axis orthogonal to the pins. Arms are coupled to the lugs via hinges that provide further axes of rotation. Finally, the arms are pivotally and rotationally coupled to a contactor 118 that slides along power rail 108 as work machine 100 moves.

In the examples of the present disclosure, the terminal assembly 200 and the connector assembly 114 enable movement of extension 110 with multiple degrees of freedom with respect to contactor 118. If irregularities in haul route 101 or in steering cause work machine 100 to veer laterally with respect to contactor 118, the hinged connections on connector assembly 114 and contactor 118 enable trailing arms 116 to move in a way to accommodate the changing relative positions. Similarly, vertical changes to extension 110 can be accommodated through the rotational features of various lugs within connector assembly 114 and contactor 118. As well, angular displacement of extension 110 relative to contactor 118 can be absorbed with, in part, the rotational features of rotational interface 202. On balance, terminal assembly 200 can provide multiple degrees of freedom for extension 110 to move relative to contactor 118, such that forces on contactor 118 that may otherwise cause detachment from power rail 108 are avoided, ensuring continued supply of electrical power to work machine 100 during movement along haul route 101.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An apparatus for conducting electrical energy, comprising:
   a rigid tubular shell having a first end and a second end, the shell having a longitudinal center defining an axis between the first end and the second end;
   a first metal tube extending along the axis;
   a second metal tube disposed concentrically around and apart from the first metal tube; and
   a terminal at the first end, comprising:
      a first metal lug electrically coupled to the first metal tube and extending orthogonally from the axis and exterior to the shell; and
      a second metal lug electrically coupled to the second metal tube and extending orthogonally from the axis and exterior to the shell.

2. The apparatus of claim 1, wherein one of the first metal lug and the second metal lug comprises a ball-and-socket joint configured to enable movement of the at least one of the first metal lug and the second metal lug around a hemispherical space.

3. The apparatus of claim 2, wherein the first metal lug comprises a pin joining the first metal tube to the ball-and-socket joint.

4. The apparatus of claim 1, further comprising:
   a third metal tube arranged concentrically around and apart from the second metal tube; and
   a third metal lug electrically coupled to the third metal tube and extending orthogonally from the longitudinal axis.

5. The apparatus of claim 4, wherein the first metal lug and the second metal lug are encased in insulative material.

6. The apparatus of claim 4, wherein the third metal tube includes an opening, and the second metal lug comprises a pin positioned within the opening and joining the second metal tube to a ball-and-socket joint.

7. A conductor assembly, comprising:
   a first metal tube extending along a longitudinal axis;
   a second metal tube arranged concentrically around and apart from the first metal tube;
   a first metal lug electrically coupled to the first metal tube and extending orthogonally from the longitudinal axis; and
   a second metal lug electrically coupled to the second metal tube and extending orthogonally from the longitudinal axis,
      wherein at least one of the first metal lug and the second metal lug comprises a pivot joint.

8. The conductor assembly of claim 7, wherein the pivot joint is configured to enable movement of the at least one of the first metal lug and the second metal lug with respect to the pivot joint around a hemispherical space.

9. The conductor assembly of claim 7, wherein the first metal lug comprises a pin joining the first metal tube to the pivot joint.

10. The conductor assembly of claim 7, further comprising:
    a third metal tube arranged concentrically around and apart from the second metal tube; and
    a third metal lug electrically coupled to the third metal tube and extending orthogonally from the longitudinal axis.

11. The conductor assembly of claim 10, wherein the second metal lug comprises a pin joining the second metal tube to the pivot joint.

12. The conductor assembly of claim 11, wherein the third metal tube includes an opening and the pin is positioned within the opening.

13. The conductor assembly of claim 10, wherein the third metal tube extends farther along the longitudinal axis than the second metal tube, and the first metal tube extends farther along the longitudinal axis than the third metal tube.

14. The conductor assembly of claim 10, wherein the first metal lug, the second metal lug, the third metal lug, and the longitudinal axis are substantially in a plane.

15. The conductor assembly of claim 14, wherein the third metal lug extends in an opposite direction in the plane from the first metal lug and the second metal lug with respect to the longitudinal axis.

16. The conductor assembly of claim 10, wherein the first metal lug comprises a first ball-and-socket joint, the second metal lug comprises a second ball-and-socket joint, and the third metal lug comprises a third ball-and-socket joint.

17. A work machine, comprising:
    an electric engine;
    traction devices configured to cause movement of the work machine when powered by the electric engine; and
    a conductor rod configured to convey electrical energy to the work machine during the movement of the work machine, the conductor rod comprising:
       a first tubular conductor and a second tubular conductor extending concentrically around a longitudinal axis and separated, at least in part, by air; and
       a first lug and a second lug disposed at an exterior of the conductor rod, the first lug and the second lug branching orthogonally from the first tubular conductor and the second tubular conductor, respectively, to the exterior, the first lug and the second lug comprising pivot joints adjacent the exterior, the pivot joints being configured to enable the first lug and the second lug to move around a hemispherical space with respect to the pivot joints.

18. The work machine of claim 17, wherein one or more tubular conductors includes an aperture for passing one of the lugs from another tubular conductor to the exterior of the conductor rod.

19. The work machine of claim 17, wherein the lugs and the longitudinal axis are substantially in a plane.

20. The work machine of claim 19, wherein one of the lugs extends in an opposite direction in the plane from others of the lugs with respect to the longitudinal axis.

\* \* \* \* \*